A. J. Craig.
Double-Shovel Plow.
N° 77260. Patented Apr. 28, 1868.

Witnesses:
W. C. Ashkettle
Wm. A. Morgan

Inventor:
And. J. Craig
per Munn & Co.
Attorneys

United States Patent Office.

ANDREW J. CRAIG, OF ASHMORE, ILLINOIS.

Letters Patent No. 77,260, dated April 28, 1868.

IMPROVEMENT IN DOUBLE-SHOVEL PLOUGH.

*The Schedule referred to in these Letters Patent and making part of the same.*

TO ALL WHOM IT MAY CONCERN:

Be it known that I, ANDREW J. CRAIG, of Ashmore, in the county of Coles, and State of Illinois, have invented a new and useful Improvement in Double-Shovel Ploughs; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish an improved double-shovel plough, so constructed as to be easily adjusted to run at a greater or less depth in the ground, or so that one plough may run deep while the other runs shallow, and to which the whiffle-tree may be readily and quickly attached; and it consists in the manner in which the plough-standards and handles are connected to the plough-beam, and in the combination of a guard-ring with the hooked forward end of the plough-beam, the whole being constructed and arranged as hereinafter more fully described.

Figure 1:
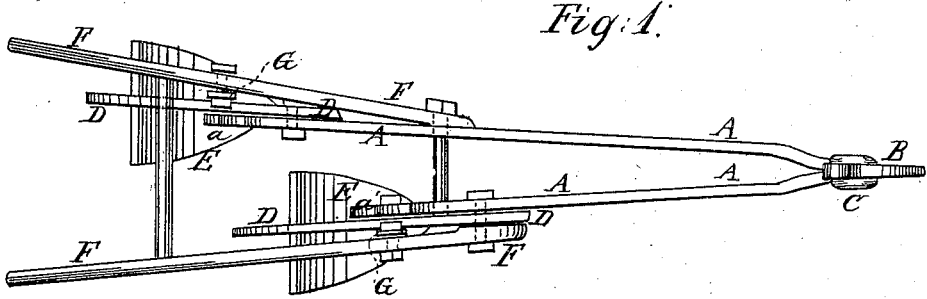
Figure 1 is a top view of my improved plough.
Figure 2:
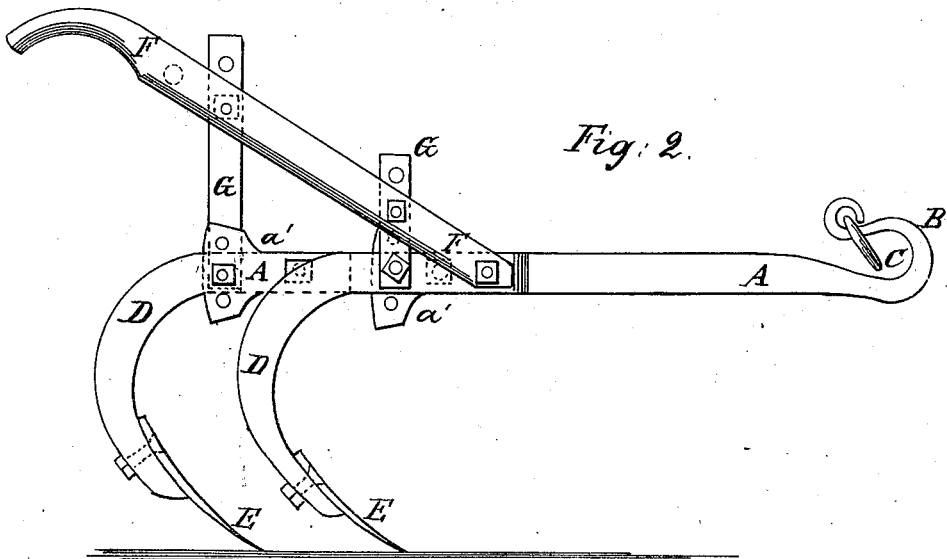
Figure 2 is a side view of the same.

A are the plough-beams, which are made in the form of a V-shaped iron frame, as shown in fig. 1. The forward ends of the beams A are welded or otherwise securely connected to each other, and have a hook, B, formed upon or firmly attached to their forward ends. The end or point of the hook B has an eye formed upon it, in which is pivoted a ring or rectangular frame, C, which hangs down upon the forward end of the beam, or upon the shank of the hook, as a guard, to prevent the draught-ring or staple by which the whiffle-tree or double-tree is connected with said beam, from becoming accidentally detached. The beams A are of unequal length, as shown in fig. 1, so that the ploughs may work, the one in advance of the other. The rear ends of the beams A are widened vertically, or have vertical cross-heads $a'$ formed upon them, as shown in fig. 2, and to the lower end of which the ploughs E are attached.

Each of the standards D is attached to its beam by two bolts, the forward bolt passing through the forward end of the said standard, and through the beam, and the rear bolt passing through the said standards, and through one or the other of the holes formed for its reception in the cross-heads $a'$ of the beams A, so that the position of the standards may be adjusted at pleasure.

F are the handles, the forward ends of which are secured to beams A by bolts, as shown in fig. 1. The handles F are adjustably supported, and held in the desired position by the uprights G, the lower ends of which are secured by the rear or adjusting-bolts, that secure the standards D to the cross-heads $a'$ of the beams A. The uprights G are secured to the handles F by bolts, which pass through the said handles, and through one or the other of the holes formed in the upper parts of the said uprights, so that the handles F may always be adjusted to stand at the proper elevation, whatever the relative position of the standards D and beams A may be.

I claim as new, and desire to secure by Letters Patent—

1. Adjustably attaching the plough-standards D to the rear ends of the beams A, by means of the vertical cross-heads $a'$ formed upon the said rear ends of the said beams, substantially as herein shown and described, and for the purpose set forth.

2. Adjustably connecting the handles F to the beams A and plough-standards D, by means of the uprights G, constructed and arranged substantially in the manner herein shown and described, and for the purpose set forth.

ANDREW J. CRAIG.

Witnesses:
A. T. ROBERTSON,
G. W. BURRES.